United States Patent [19]
von Sivers et al.

[11] Patent Number: 4,690,238
[45] Date of Patent: Sep. 1, 1987

[54] FOUR-WHEEL DRIVE ARRANGEMENT FOR MOTOR VEHICLES

[75] Inventors: Rolf von Sivers, Rutesheim; Kim Havemann, Weissach; Bernhard Ilsemann, Stadtweg, all of Fed. Rep. of Germany

[73] Assignee: Dr. Ing. h.c.F. Porsche Aktiengesellschaft, Fed. Rep. of Germany

[21] Appl. No.: 833,009

[22] Filed: Feb. 26, 1986

[30] Foreign Application Priority Data

Feb. 26, 1985 [DE] Fed. Rep. of Germany ..... 35606727

[51] Int. Cl.$^4$ ............... B60K 5/04; B60K 17/348
[52] U.S. Cl. ................. 180/248; 180/75.2; 180/297
[58] Field of Search ........... 180/233, 247, 248, 249, 180/250, 251, 70.1, 75.2, 291, 297, 300

[56] References Cited

U.S. PATENT DOCUMENTS

| | | | |
|---|---|---|---|
| 3,089,559 | 5/1963 | Rieck | 180/75.2 |
| 3,848,694 | 11/1974 | Matsui | 180/75.2 |
| 4,403,676 | 9/1983 | Fujii | 180/297 |
| 4,413,701 | 11/1983 | Kumagai | 180/297 |
| 4,431,079 | 2/1984 | Suzuki | 180/233 |
| 4,597,467 | 7/1986 | Stockton | 180/233 |

FOREIGN PATENT DOCUMENTS

| | | | |
|---|---|---|---|
| 2156783 | 5/1973 | Fed. Rep. of Germany . | |
| 3428574 | 3/1985 | Fed. Rep. of Germany . | |
| 126727 | 8/1982 | Japan | 180/233 |
| 2139972 | 11/1984 | United Kingdom | 180/248 |

Primary Examiner—John J. Love
Assistant Examiner—Everett G. Diederiks, Jr.

[57] ABSTRACT

A four-wheel drive arrangement for vehicles having a transversely mounted engine includes an angular drive arrangement which incorporates several design features to reduce undesirable movement of the arrangement and resulting noise inside the vehicle. These features include support of the angular drive gear assembly at a point other than where it is fastened to a transmission/differential combination (e.g., by a bracket fastened to the engine), formation of the clutch and differential gear housing as an integral unit, resonance decoupling of a cardan shaft arrangement driven by the angular drive gear, and design of the angular drive gear assembly housing so as to reduce the length of the output shaft and associated bearing support. Specific arrangements for supporting the angular drive gear assembly and sections of the cardan shaft arrangement are also disclosed, as are specific features of the unitary housing which contributes to the overall reduction of inside noise levels.

18 Claims, 7 Drawing Figures

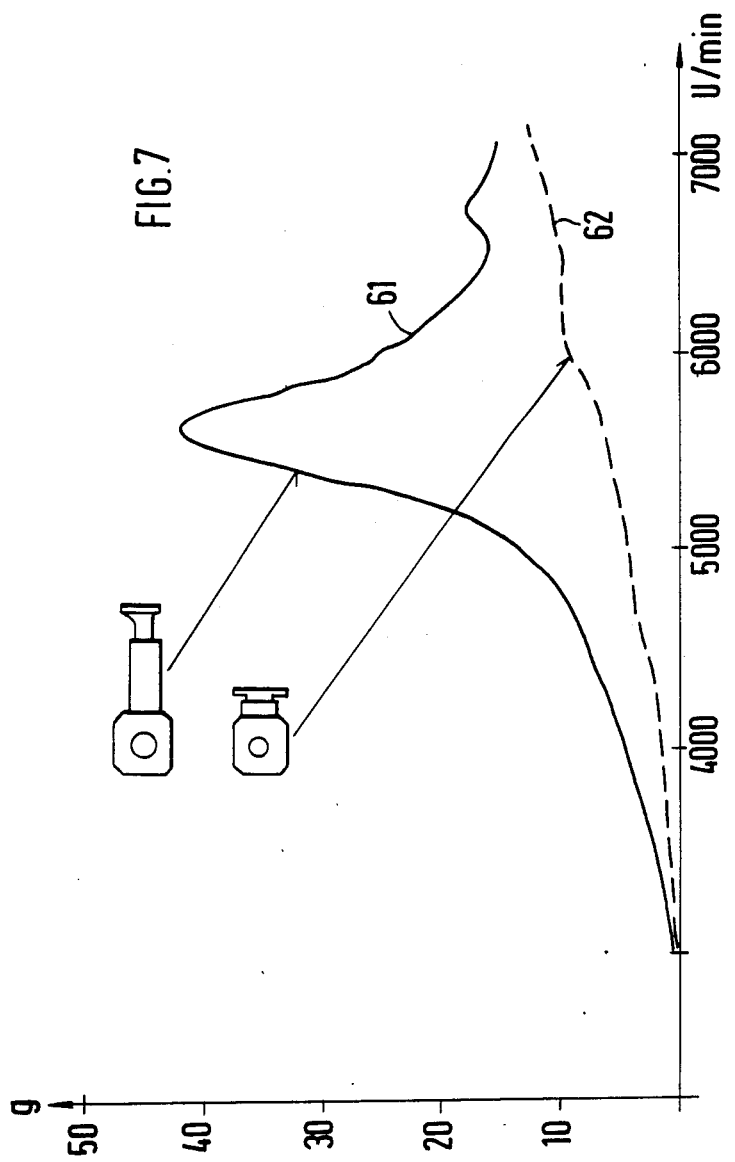

FOUR-WHEEL DRIVE ARRANGEMENT FOR MOTOR VEHICLES

BACKGROUND AND SUMMARY OF THE INVENTION

This invention relates to a four-wheel drive arrangement for motor vehicles, particularly for passenger cars which have an in-line internal-combustion engine mounted, preferably, in front of the front axle and transversely to the longitudinal axis of the vehicle, wherein the internal-combustion engine drives the front and rear wheels via a transmission (e.g., a gear box and a clutch), a differential gear and an angular drive gear assembly.

In a vehicle with four-wheel drive described in German Unexamined Printed Patent Application No. 33 17 247, an angular gear has a relatively long bearing neck, extending in the longitudinal direction of the vehicle, for an output shaft which is connected to a two-part cardan shaft. The length of the output shaft is therefore also relatively long. In addition, the angular gear assembly extends a certain distance from the transversely located internal-combustion engine; i.e., it is fastened only at the differential gear. A disadvantage of this construction is that, due to the angular gear assembly being connected at the output side and to the total length of the bearing neck and its output shaft, whip-like accelerations occur during the operation of the motor vehicle, causing excessive noise on the inside of the vehicle. This noise is further affected by the bending vibrations of the two-part cardan shaft which, via the angular gear assembly, is incited by the second order of the speed of the four-cylinder internal-combustion engine.

An object of this invention is to take such measures at the angular gear assembly, or at adjacent units, and at the cardan shaft of a vehicle equipped with a four-wheel drive so that the inside noise throughout the speed range of the internal-combustion engine does not exceed an acceptable level.

This and other objects are attained, in a four-wheel drive arrangement which comprises a transmission/differential combination for driving a first axle and an angular drive arrangement for driving a second axle, by a number of measures which include providing additional support for the angular drive at a point other than where the angular drive is connected to the transmission/differential unit. This support is preferably provided by a bracket-type support member fastened to an end of the angular drive gear housing and to the internal-combustion engine. The base of the bracket preferably extends vertically over a substantial portion of a housing (e.g., the engine block) of the engine and is located in an area provided with an internal (to the engine housing) transverse support member. The bracket is preferably formed in a stamping, casting or similar process. In another embodiment, the additional support is provided by support flanges formed on the housing of the angular drive and fastened directly to the engine housing.

In an especially advantageous embodiment of the present invention, the transmission includes a gear box and a clutch assembly, and the housing of the clutch assembly and the differential gear is formed as an integral housing unit. The integral housing preferably includes a support flange or neck for a bearing which is reinforced by a plurality of radially extending ribs on the housing. A number of lugs are provided around an outer wall of the housing for use in fastening the housing to the angular drive. At least some of the ribs preferably extend in the direction of the lugs. In an especially preferred embodiment, the outer wall of the housing is substantially uniform in height around at least a portion of the housing, especially along a transitional portion of the housing between the clutch and differential gear. The housing also preferably includes a supporting web, extending circumferentially around at least a portion of the housing, inside of the outer wall.

In an especially preferred embodiment of the invention, the angular drive includes an angular drive gear arrangement and a cardan shaft arrangement connected to an output shaft of the angular drive gear by a resonance decoupling device. The cardan shaft arrangement preferably comprises three sections. The center section is preferably connected to the end sections by synchronous joints and the output end of the arrangement is preferably connected to a differential gear associated with the second axle by a resonance decoupling device. The resonance decoupling device preferably includes an elastic (e.g., rubber) disk. The center section of the shaft is also preferably supported by bearings mounted on an adjacent wall surface (e.g., the floor board) of the vehicle.

In yet another especially preferred and advantageous embodiment of the invention, the angular drive gear assembly includes an output shaft supported by a bearing which is situated in a neck or flange which extends, along a longitudinal axis of the vehicle, for a relatively short distance from the angular gear assembly. A connecting element is provided on the output shaft for connecting to the cardan shaft arrangement. The connecting element preferably extends only slightly beyond the open end of the bearing neck.

The main advantage achieved by means of the present invention is that, by supporting the angular gear assembly at the internal-combustion engine, and due to the relatively short overall length of the bearing neck and of the output shaft, and through use of resonance decoupling of the output shaft from the angular gear assembly, noise levels inside the vehicle during operation are low. The bracket-type support is not only easy to manufacture, but can also be fastened without problems at the angular gear assembly and at the internal-combustion engine, for example, by means of screws. When the effective base of the support extends over a significant part of the height of the internal-combustion engine housing, relative movements between the angular gear assembly and the internal-combustion engine are largely avoided. The connection of the support at a partition or transverse support of the internal-combustion engine ensures effective operation.

The advantages gained with respect to lower inside noises are enhanced also by the fact that the clutch housing and the differential gear housing are combined into one constructional unit, and that the bearing neck of the differential gear, with respect to its outside wall, is supported by star-shaped ribs. Also contributing to this behavior are the outside walls of the housing which extend around the bearing neck without any significant contractions, as well as the supporting web which extends between the outside wall and the bearing neck of the differential gear housing.

Finally, the three part cardan shaft arrangement of the present invention operates without resonance while in connection with an upright and transversely installed four-cylinder in-line internal-combustion engine running up to a speed of 7,000 revolutions per minute. In this regard, the synchromesh joints also ensure a uniform rotating motion of the center shaft section when the shaft sections, for constructional reasons, are not located in one plane.

Further objects, features and advantages of the present invention will become more apparent from the following description when taken with the accompanying drawings, which show for purpose of illustration only, an embodiment constructed in accordance with the present invention.

BRIEF DESCRIPTION OF THE DRAWINGS

FIG. 7 is a diagram useful for the purpose of demonstrating the results of the invention.

DETAILED DESCRIPTION OF THE INVENTION

Figure 1:
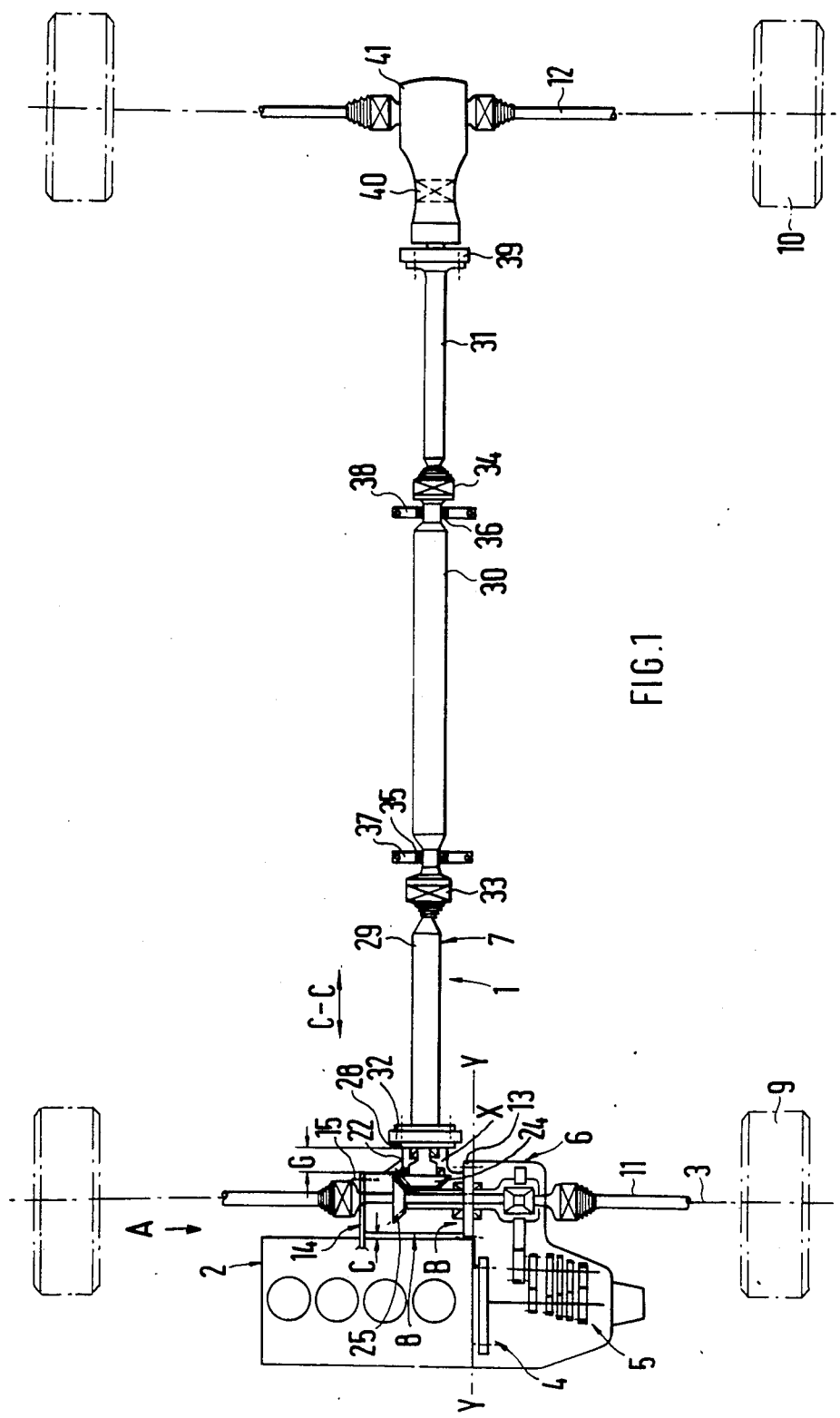
FIG. 1 is a top view of a drive unit of a motor vehicle having a four-wheel drive.

The four-wheel drive unit 1 of a passenger car that is not shown in detail comprises an internal-combustion engine 2 extending transversely to the longitudinal direction C—C of the vehicle. The four-cylinder internal-combustion engine illustrated has essentially upright cylinders and is arranged in front of a front axle that is symbolized by the Line 3, and is connected with a gear box 5 containing a clutch 4. A differential gear 6 is connected to the output side of gear box 5, and to an angular drive gear assembly 8 connected with a cardan shaft arrangement 7. The front wheels 9 and the rear wheels 10 are driven via the differential gear 6 and the angular gear assembly 8, with the front wheels 9 driven by the axle shafts 11, and the rear wheels 10 driven by the axle shafts 12.

Figure 3:
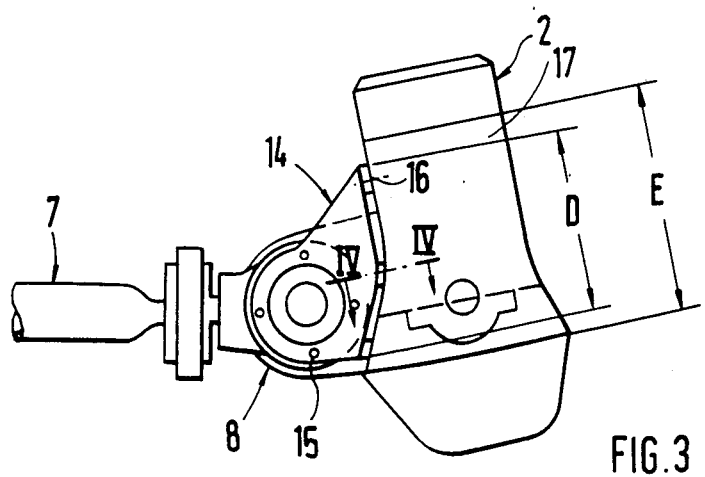
FIG. 3 is an enlarged view taken in the direction of Arrow A of FIG. 1, but rotated by 180°.

At 13, the angular gear assembly 8 is screwed to the differential gear 6 and extends approximately parallel to and at a distance C from the internal-combustion engine 2, and is fastened to the engine. A bracket-type support 14 is used for this purpose and is arranged on the side of the angular gear assembly 8 that faces away from the differential gear 6. Support 14, which is formed by a stamping, casting, or similar process, is connected with the angular gear assembly 8 and the internal-combustion engine 2 by means of screws 15 and 16 (FIG. 3). In addition, the effective base D of support 14 on the side of the internal-combustion engine extends along a substantial part of the height E of a housing 17, in this case the cylinder crankcase, of the engine.

Figure 4:
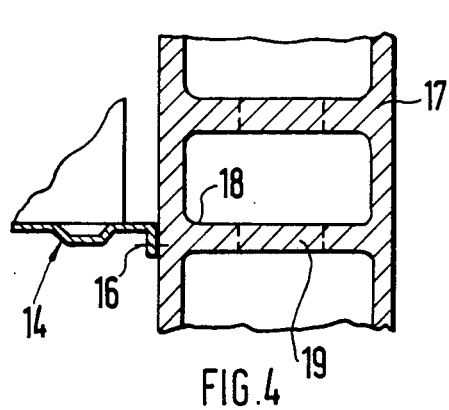
FIG. 4 is an enlarged sectional view along Line IV—IV of FIG. 3.

In order to avoid flexing movements of the wall of housing 17, the essentially vertically extending support 14 is connected to the internal-combustion engine 2 in the area of a partition which also forms a main bearing 19 for a crankshaft that is not shown (FIG. 4).

Figure 5:
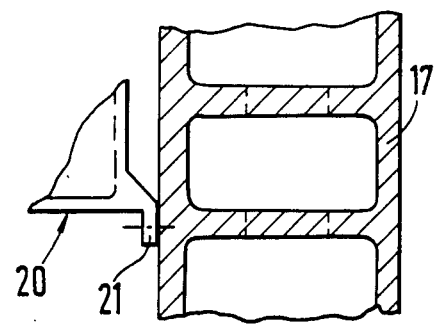
FIG. 5 is a view corresponding to FIG. 4 of another embodiment.

In the embodiment shown in FIG. 5, instead of support 14, a housing 20 of the angular gear assembly 8 has a supporting flange 21 provided that is screwed to housing 17.

Figure 2:
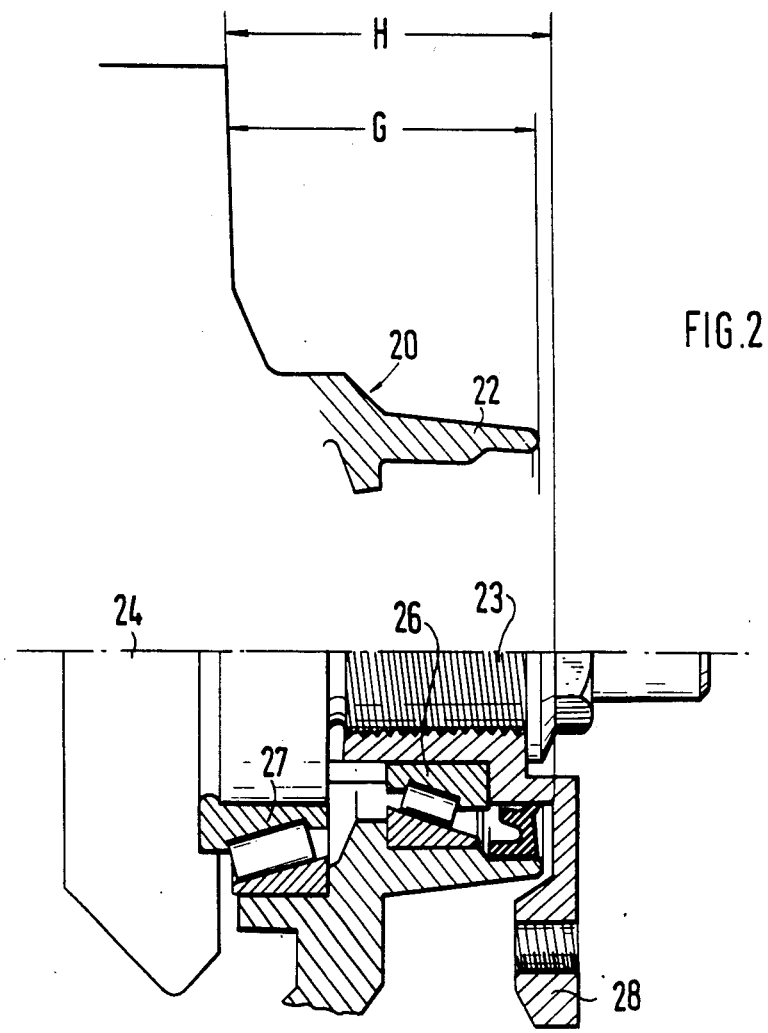
FIG. 2 is a sectional and enlarged view of detail X of FIG. 1.

The housing 20 of the angular gear assembly 8 is equipped with a bearing supporting flange or neck 22 for an output shaft 23 extending in the longitudinal direction C—C of the vehicle. The conical gear 24 of the shaft interacts with a conical gear 25 (FIG. 1) powered by the differential gear 6. The bearing neck 22 is relatively short (distance G), but nevertheless has an adequate bearing base for two conical roller bearings 26 and 27 which are arranged coaxially and at a short distance from one another and in which the output shaft 23 is disposed. The output shaft 23, at its free end, is equipped with a connecting element 28 that is fastened on it and that only slightly projects over the bearing neck 22 (distance H in FIG. 2). The connecting element 28 of the output shaft 23 is connected to the cardan shaft arrangement 7, which has three shaft sections 29, 30 and 31 located one after another, via a resonance decoupling device 32. The resonance decoupling device 32 is, for example, formed by a type of elastic disk, such as a rubber disk into which fastening sleeves are vulcanized.

The center shaft section 30 is connected with the shaft sections 29 and 31 by synchro-joints 33 and 34. In addition, the center section is disposed in ball bearings 35 and 36 which are fastened to the body, preferably the floor panel, of the motor vehicle by special holders 37 and 38. Details of the body and the floor panel are not shown.

The rear shaft section 31 is connected with a rear axle differential gear 41, having a center differential 40 by another resonance decoupling device 39 which corresponds in construction to decoupling device 32. Between the rear axle differential gear 41 and the decoupling device 39, a visco-coupling may also be provided.

Figure 6:
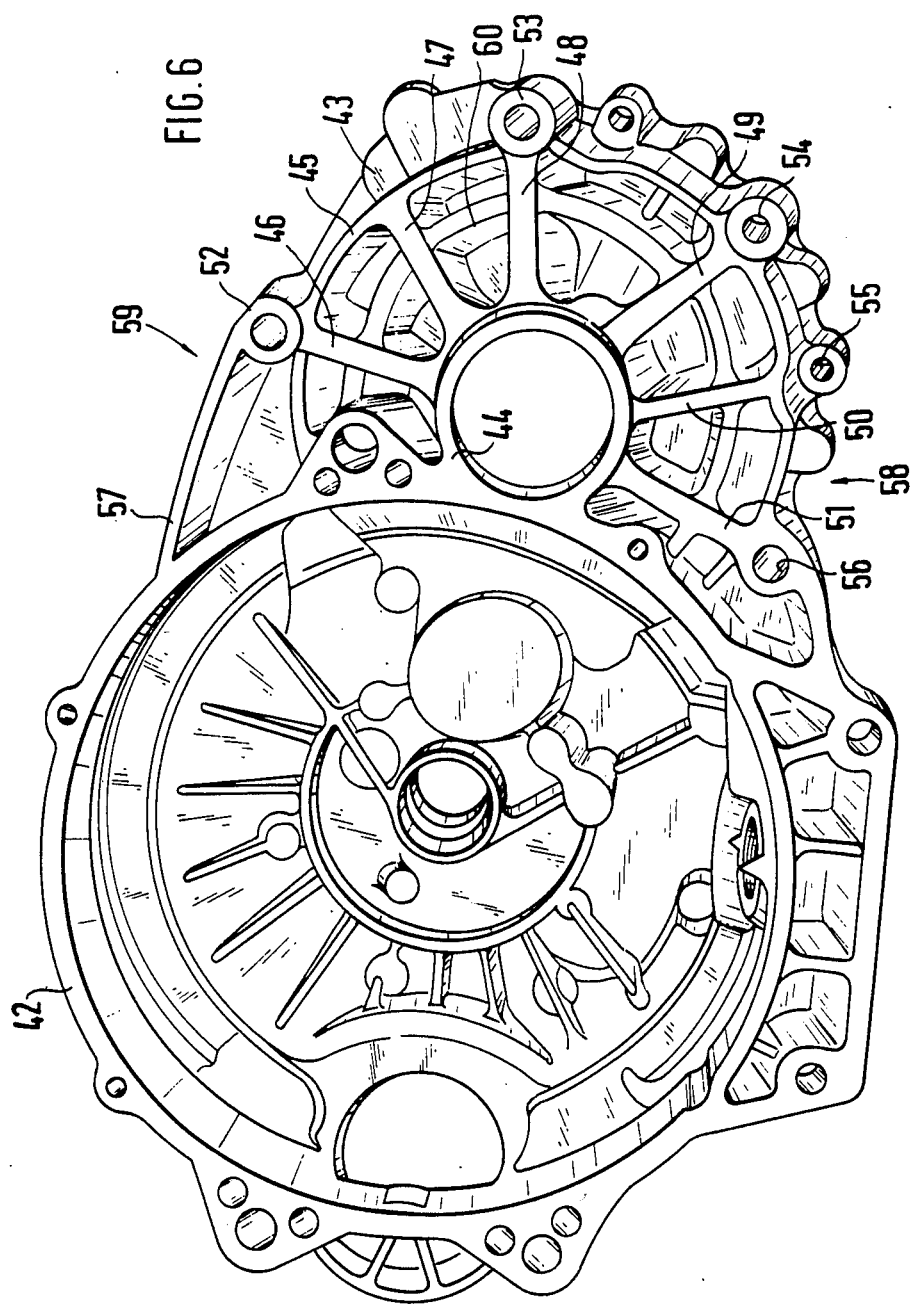
FIG. 6 is an enlarged perspective view, taken approximately in the direction of Arrow B in FIG. 1, of a constructional unit detached from the four-wheel drive arrangement of the present invention, as viewed along Line Y—Y in FIG. 1.

In addition to the above-described features, the clutch housing 42 and differential gear housing 43, which are combined into one constructional unit, may be reinforced as shown in FIG. 6. Accordingly, a bearing neck 44 of the differential gear housing 43, with respect to an at least partially circularly extending outside wall 45, is supported by several ribs 46, 47, 48, 49, 50, 51 extending in a star-shaped manner. Some of these ribs terminate at lugs 52, 53, 54, 55 and 56 located beyond the outside wall. The lugs are used for fastening differential gear housing 43 to the angular gear assembly 8. In addition, the outside walls 45 and 57 of the constructional unit, especially in the transition areas 58 and 59 between the two housings, are of a uniform height so as not to impair the stiffness of the constructional unit. Finally, a supporting web 60 is provided between the outside wall 45 of the differential gear 6 and the bearing neck 44.

In the diagram shown in FIG. 7, the acceleration g is entered on the ordinate, and the engine speed in revolutions per minute is entered on the abscissa. The solid line 61 shows a drive unit having a bearing neck of conventional length and an angular drive gear assembly that has no support relative to the engine. This diagram shows that over a relatively large speed range, an unacceptable acceleration value occurs. This acceleration value can be considerably reduced for a structure which incorporates the features of the present invention, as illustrated by the interrupted line 62.

Although the present invention has been described and illustrated in detail, it is to be clearly understood that the same is by way of illustration and example only, and is not to be taken by way of limitation. The spirit and scope of the present invention are to be limited only by the terms of the appended claims.

We claim:

1. A four-wheel drive arrangement for a motor vehicle, having a transversely mounted internal-combustion engine, comprising:

transmission means for receiving power from the engine and for driving a first set of vehicle wheels; and angular drive means for receiving power from said transmission means and for driving a second set of vehicle wheels;

wherein said transmission means and said angular drive means are fastened together at an output end and an input end of the respective transmission and angular drive means; and support means for rigidly supporting a housing of said angular drive means, relative to said internal-combustion engine, at a point distal from said input end of said angular drive means;

wherein said angular drive means includes angular drive gear assembly means and a cardan shaft arrangement connected to an output shaft of the angular drive gear assembly means by a resonance decoupling device; and wherein said angular drive means includes angular drive gear assembly means having an output shaft supported by bearing means disposed in a supporting neck of the angular drive means housing, said neck extending a distance along a longitudinal axis of the vehicle, said distance being not substantially longer than necessary to provide adequate support for the bearing means, and a connecting element on the output shaft which extends a slight distance beyond an end of the bearing supporting neck.

2. A four-wheel drive arrangement according to claim 1, wherein said support means comprises a bracket-type support attached to the angular drive means housing and to the internal-combustion engine.

3. A four-wheel drive arrangement according to claim 2, wherein said support is mounted on an end of said angular drive means housing opposite said input end of said angular drive means.

4. A four-wheel drive arrangement according to claim 2, wherein said support is attached to the angular drive means housing and to the internal-combustion engine by screw means.

5. A four-wheel drive arrangement according to claim 2, wherein said support has a base which extends substantially vertically over a substantial portion of a housing of the internal-combustion engine.

6. A four-wheel drive arrangement according to claim 5, wherein the vertically extending base of the support is connected to the housing of the internal-combustion engine in the area of a transversely extending wall of said engine housing.

7. A four-wheel drive arrangement according to claim 2, wherein said support is formed by a stamping process, a casting process, or a similar process.

8. A four-wheel drive arrangement according to claim 1, wherein said support means comprise support flanges on a housing of the angular drive means.

9. A four-wheel drive arrangment according to claim 8, wherein said housing is attached to the internal-combustion engine at said support flanges.

10. A four-wheel drive arrangement according to claim 1, wherein said transmission means comprises a gear box, a clutch and a differential gear, and wherein a housing of the clutch and of the differential gear is formed as an integral housing unit.

11. A four-wheel drive arrangement according to claim 10, wherein said integral housing includes support means for supporting a bearing relative to an outer wall of the integral housing, said support means including a plurality of ribs radially extending across at least a portion of the integral housing, and wherein said integral housing includes lug means at the outer wall of the integral housing for fastening the integral housing to the angular drive means.

12. A four-wheel drive arrangement according to claim 11, wherein at least some of said ribs extend radially across the integral housing in the direction of said lug means.

13. A four-wheel drive arrangement according to claim 11, wherein the outer wall of the integral housing is of substantially uniform dimension along at least a portion of the integral housing, particularly along a transitional portion of the integral housing between the clutch and differential gear.

14. A four-wheel drive arrangement according to claim 11, wherein said support means includes a supporting web extending circumferentially around at least a portion of the integral housing, inside of said outer wall.

15. A four-wheel drive arrangement according to claim 1, wherein said cardan shaft arrangement comprises three shaft sections, and wherein a center shaft section is connected to an end shaft section by a synchronous joint, and wherein the end shaft section is connected to one of the angular drive means and a differential gear, connected to said second set of vehicle wheels, by a resonance decoupling device.

16. A four-wheel drive arrangement according to claim 15, wherein the resonance decoupling device includes an elastic disk.

17. A four-wheel drive arrangement according to claim 15, wherein the center shaft section is supported by bearing means mounted on an adjacent wall surface of the vehicle.

18. A four-wheel drive arrangement for a motor vehicle having a transversely mounted internal-combustion engine, comprising:

transmission means for receiving power from the engine and for driving a first set of vehicle wheels, said transmission means comprising a gear box, a clutch, and a differential;

angular drive means for receiving power from the transmission means and for driving a second set of vehicle wheels, said angular drive means comprising angular drive gear assembly means, fastened to the differential of the transmission means, and a cardan shaft arrangement; and support means, fastened to the internal-combustion engine and to a housing of the angular drive gear assembly means at a point distal from the differential of the transmission means, for supporting said gear assembly means;

wherein said angular drive gear assembly means has an output shaft supported by bearing means disposed in a supporting neck extending a distance along a longitudinal axis of the vehicle, said distance being not substantially longer than necessary to provide adequate support for the bearing means, and a connecting element on the output shaft which extends a slight distance beyond an end of the bearing supporting neck, and wherein said connecting element is connected to the cardan shaft arrangement by a resonance decoupling device.

* * * * *